C. E. LANNIN.
DEVICE FOR STRIPPING THE LEAVES FROM FRUIT.
APPLICATION FILED NOV. 15, 1915.
1,222,003. Patented Apr. 10, 1917.
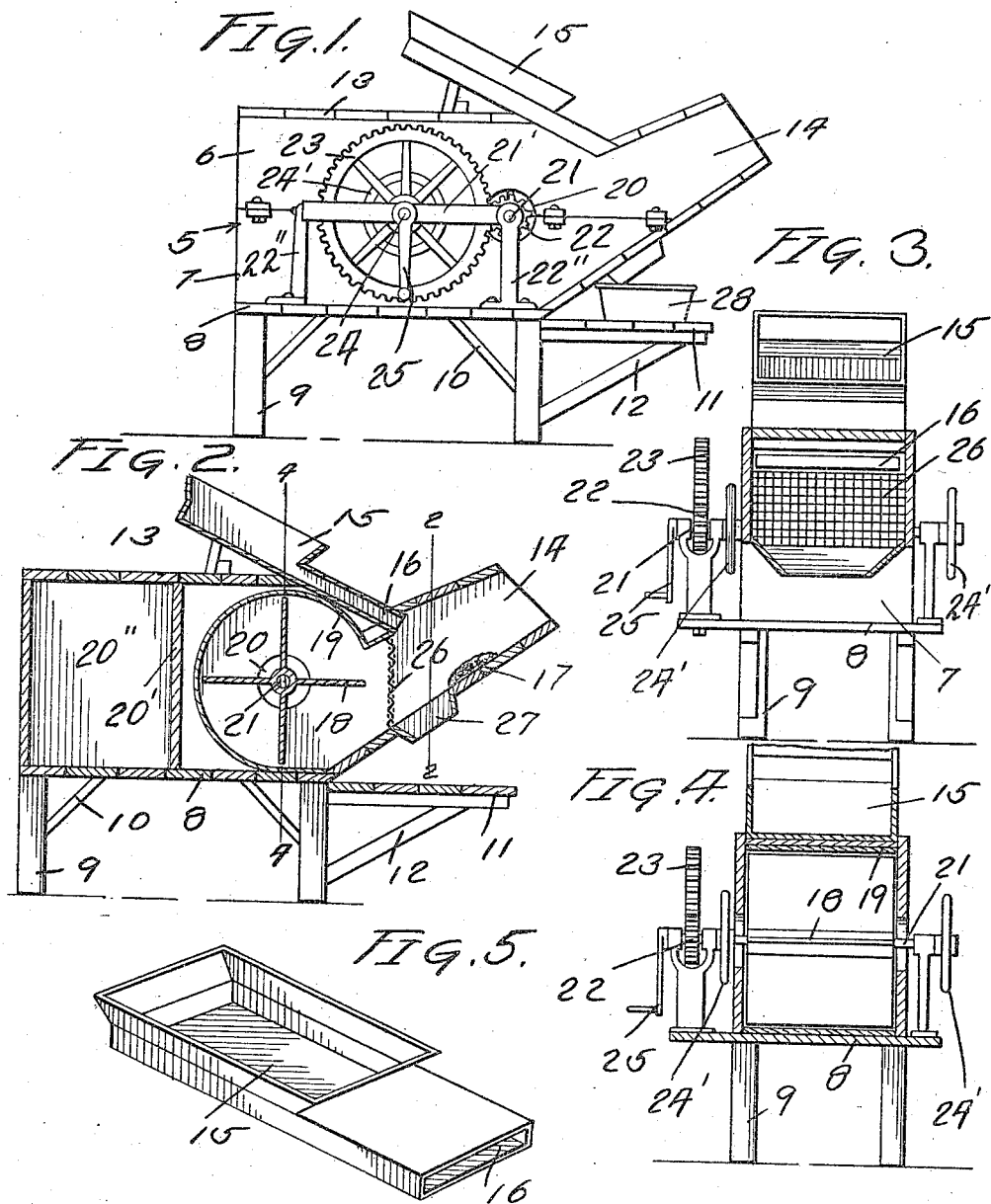

UNITED STATES PATENT OFFICE.

CHARLES E. LANNIN, OF OLD MISSION, MICHIGAN.

DEVICE FOR STRIPPING THE LEAVES FROM FRUIT.

1,222,003.  Specification of Letters Patent.  Patented Apr. 10, 1917.

Application filed November 15, 1915. Serial No. 61,600.

*To all whom it may concern:*

Be it known that I, CHARLES E. LANNIN, a citizen of the United States, residing at Old Mission, in the county of Grand Traverse, State of Michigan, have invented certain new and useful Improvements in Devices for Stripping the Leaves from Fruit; and I do hereby declare the following to be a full, clear, and exact description of the invention, such as will enable others skilled in the art to which it appertains to make and use the same.

This invention relates to machines for blowing the leaves from fruit, and pertains more particularly to devices for removing the leaves from cherries, and it consists in the mechanism for operating an air blast, so that the fruit when passed in front of same, will be stripped of its leaves and deposited in a proper receptacle, and ready for market.

A further object of my invention is to provide a machine which will be adapted to blow dirt and chaff out of beans, gooseberries and other of the smaller fruit, and means are provided for either manually operating the same, or connecting the machine to a motor.

The invention consists of means hereinafter fully described and particularly set forth in the claim annexed, and the following description set forth in detail, certain means embodying the invention, such means constituting but one of the various mechanical forms in which the principle of the invention may be used.

In the annexed drawing, illustrating the particular embodiment of my invention:

Figure 1 is a side elevational view of my improved leaf removing device for fruit.

Fig. 2 is a vertical longitudinal cross section of Fig. 1.

Fig. 3 is a vertical section on the line 2—2 of Fig. 2.

Fig. 4 is a vertical section on line 4—4 of Fig. 2.

Fig. 5 is a perspective view of the hopper.

The blower of my improved construction comprises a longitudinally disposed casing indicated at 5, which is formed of upper and lower parts 6 and 7, connected or secured together at their meeting edges by bolts or the like, and said casing is supported upon a suitable platform 8, having pairs of end legs 9, which are braced by the angularly disposed bars 10, connected with the legs 9 and the said platform 8. The platform 8 is provided with an extension 11 at one end, which is supported by the angularly disposed brace bars 12, the purpose of which will later be more fully described.

The upper part of the casing 5 is provided with a top 13, comprising a plurality of transverse planks and formed integral with the upper and lower portions of the casing 5, and communicating with the interior thereof is a funnel-shaped hood 14. A hopper 15, from which the fruit is admitted to the interior of the machine, is angularly disposed on the top 13 of the casing, adjacent and in the rear of the hood 14, and the lower open end of the hopper projects through an opening in the hood and the fruit from the said hopper, upon passing through the opening 16, at the inclined end of the hopper, will fall upon a cushion member 17, arranged on the lower inner face of the hood 14.

A continuous blast of air is forced upward from the interior of the casing 5, through the hood 14, by means of a fan 18, rotating in a drum 19. The air is admitted to the drum from the opening 20 in the drum. A partition 20' is positioned between the drum 19 and the end of the casing forming a tool box 20''.

The fan 18 is of the usual construction, mounted on the transverse shaft 21, which latter is journaled in the horizontal journal bars 21', supported on the standards 22'', and connected with the said shaft 21 and disposed on the outside of the said casing 5, is a fan gear wheel 22. The fan gear 22 meshes with a large or major gear 23, mounted on the transverse shaft 24, the forward standards 22'' and carries fly wheels 24'. A handle 25 may be connected to the shaft 24, to revolve the same, to actuate the said gear 23, and in turn the fan gear 22, whereby the fan is revolved to force the air upwardly through the hood.

Should it be desired, the machine may be driven by a belt passed around one of the fly wheels 24', to a suitable source of energy.

A screen 26 is vertically disposed across the hood, immediately in front of the fan 18, and extends at right angles to the exit opening 27, in the lower part of the inclined bottom wall of the hood, and through which the fruit passes, after being stripped of the leaves, during its downward passage in front of the screen 26.

A description of the leaf stripping operation is as follows:

The fruit, (and this operation will describe the stripping of cherries, and as the latter are generally removed from the trees in bunches, by means of fruit gatherers, they are usually accompanied by the foliage, and it is the main object of this machine to pass the cherries and their foliage before an air blast, whereby the said leaves constituting the foliage, are blown from the cherries) and in this connection the cherries, placed in the inclined hopper, are fed by gravity into the upper casing opening 16, immediately below said hopper, and over upon the cushion member 17, positioned in the hood. This cushion member 17, may be constructed of several thicknesses of cloth, or cotton batting may be quilted in any approved manner, to form a stop of such a nature as to not injure the fruit, when the same contacts therewith.

The cushion member, by being secured to the inclined lower portion of the hood, naturally deflects the fruit downwardly toward the screen 26, and the fruit at the same time is aided by its specific gravity, and falls through the opening 27, into the receptacle 28 on the platform 11, disposed directly thereunder.

It is obvious that upon actuating the major gear 23, by means of the handle 25, the fan, through the fan gears meshing engagement with the major gear, will be revolved to force a blast of air from the interior of the casing, outwardly through the hood, and the fruit during its passage through the said hood will be relieved of its foliage, which latter is blown outwardly by said blast, through the said hood, and the fruit then passes through the lower opening in the hood to the receptacle.

From the foregoing description, taken in connection with the accompanying drawing, the advantages of construction and the method of operation will be readily apparent to those skilled in the art to which the invention appertains, and while I have described the principle of operation of the invention, together with the device, which I now consider to be the embodiment thereof, I desire to have it understood that the device shown is merely illustrative, and that changes may be made as desired, as are within the scope of the claim appended hereto.

What I claim and desire to secure by Letters Patent, is:

In a device of the type set forth, the combination with a casing, of an air drum arranged in said casing, an air inlet in said casing, communicating with said drum, an air outlet hood connected to said drum, a fan blower mounted in said drum, operable means on said casing for driving said fan blower, a hopper arranged on said casing, said hood having an opening adjacent one end of said hopper and adapted for the passage of material therethrough, and having an outlet opening, a screen positioned in said hood between the outlet opening and the drum and clear of the path of fruit passing from the hopper, and a pad of soft material fixed to the bottom of the outlet hood and projecting thereabove at the edge of the first-mentioned opening remote from the drum.

In testimony whereof, I affix my signature, in the presence of two witnesses.

CHARLES E. LANNIN.

Witnesses:
 CARL J. MATSON,
 FRED MATSON.

Copies of this patent may be obtained for five cents each, by addressing the "Commissioner of Patents, Washington, D. C."